United States Patent [19]

Stemme et al.

[11] 4,263,000
[45] Apr. 21, 1981

[54] METHOD OF, AND APPARATUS FOR PHOTOGRAPHICALLY MAKING POSITIVE PICTURES

[75] Inventors: Otto Stemme, Munich; Peter Lermann, Narring; Volkmar Stenzenberger, Unterhaching; Werner Went, Leverkusen; Eberhard Herzig, Cologne; Friedrich-Ludolph Hoesch, Leichlingen, all of Fed. Rep. of Germany

[73] Assignee: AGFA-Gevaert AG, Leverkusen, Fed. Rep. of Germany

[21] Appl. No.: 32,901

[22] Filed: Apr. 24, 1979

[30] Foreign Application Priority Data

Apr. 27, 1978 [DE] Fed. Rep. of Germany ....... 2818616

[51] Int. Cl.³ .................. G03B 27/32; G03B 27/52; G03B 13/28
[52] U.S. Cl. ......................................... 355/27; 355/45
[58] Field of Search ....................... 355/27, 44, 45, 64, 355/65

[56] References Cited

U.S. PATENT DOCUMENTS

| | | | |
|---|---|---|---|
| 2,930,304 | 3/1960 | De Zelar | 355/44 X |
| 3,040,640 | 6/1962 | Abel, Jr. et al. | 355/27 X |
| 3,065,667 | 11/1962 | Edgerton | 355/64 X |
| 3,509,807 | 5/1970 | Sutton et al. | 355/27 X |
| 3,642,367 | 2/1972 | Ruff | 355/45 |
| 4,082,446 | 4/1978 | Driscoll et al. | 355/27 |
| 4,184,763 | 1/1980 | Handsman et al. | 355/27 |

*Primary Examiner*—Richard A. Wintercorn
*Attorney, Agent, or Firm*—Michael J. Striker

[57] ABSTRACT

The invention concerns a method of, and an apparatus for, photographically making positive pictures from individual frames of motion-picture films, film strips and microfilms. The image from a respective selected film frame is exposed onto a self-developing ("instant-picture") film sheet which is then developed to produce a positive paper picture of this image.

4 Claims, 4 Drawing Figures

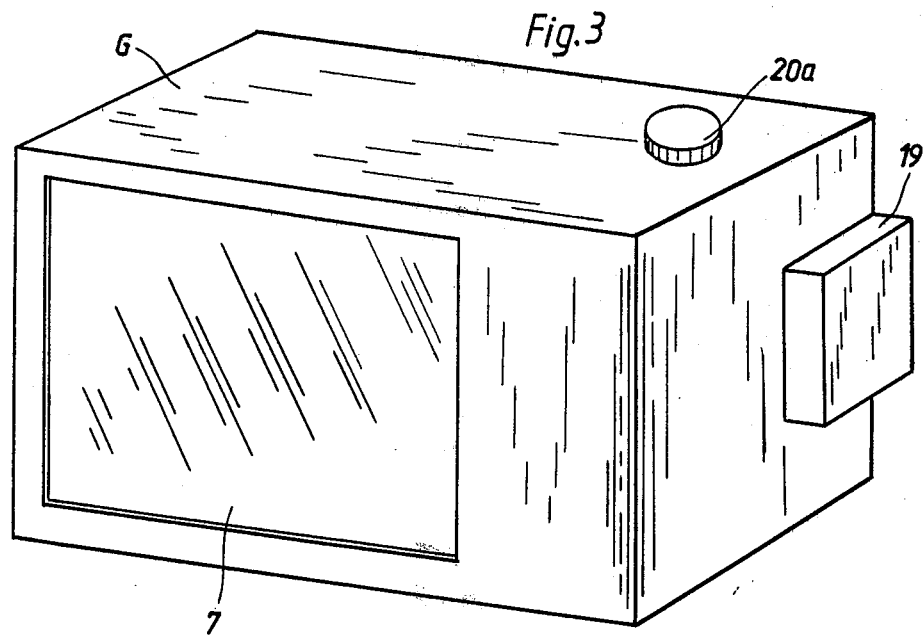
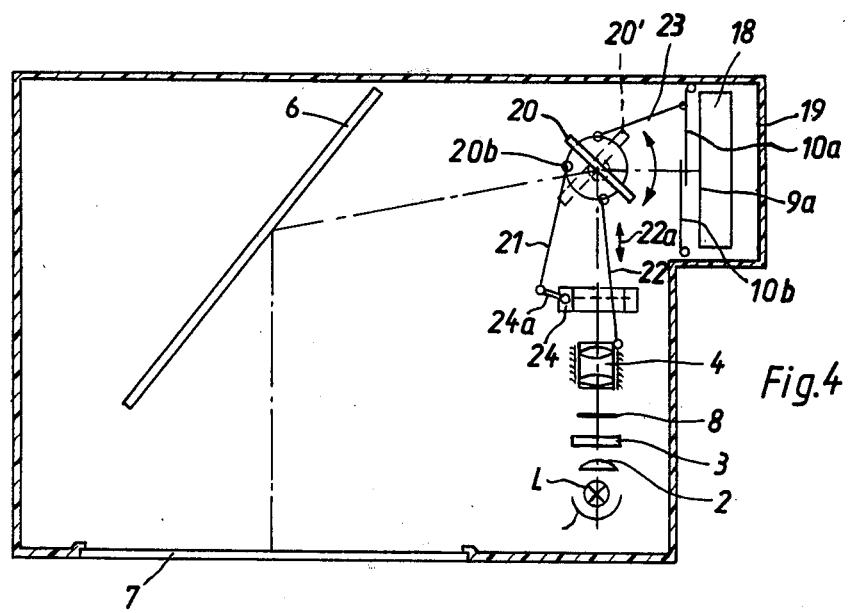

METHOD OF, AND APPARATUS FOR PHOTOGRAPHICALLY MAKING POSITIVE PICTURES

BACKGROUND OF THE INVENTION

1. Field of the Invention

This invention relates to photography.

More particularly, the invention relates to making positive photographic pictures.

Still more specifically, the invention relates to a method of, and an apparatus for, making positive photographic pictures from e.g. the frames of a motion-picture film or the like.

2. The Prior Art

It is often desired to make positive (i.e. paper) pictures from individual frames of a motion-picture film, film strip or microfilm, and the prior art provides several ways of doing this.

One approach is to exactly mark the film frame or frames to be reproduced and then to submit the film to a commercial processor to print paper pictures of the marked frames. This is, however, easier said than done, since it is difficult to mark individual frames without damage to the film and even more difficult to find the marked frames (a film having a half-hour running time has about 30,000 individual frames). Because of the time and cost involved this approach is, therefore, used only in exceptional instances.

Another possibility is to cut from the film a small length having the frame to be reproduced and one or two of the succeeding and preceding frames, and then to submit this length to a commercial processor. However, this involves making two additional cuts in the film and, during later reinsertion, two additional splices, all in addition to cuts and splices previously made during e.g. editing of the film. This is often undesired and therefore this second approach is also used only rarely.

Finally, there exist special cameras, and for single-lens reflex cameras there exist special adapters, by means of which a film frame can be photographed on an enlarged scale. The resulting negative can then be used in an additional step to make positive (i.e. paper) pictures of the film frame. There is no problem with this latter approach, except that it requires special developing techniques for the film and the positive paper which are beyond the abilities of most amateurs. Insofar as microfilms are concerned, the viewing of individual frames of these can be accomplished by means of any of the various readers, some of which are inexpensive enough to be afforded by amateur users (i.e. private individuals or small businessmen). Making copies of individual microfilm frames is also possible with equipment specially developed for this purpose. However, unlike the readers the microfilm frame enlargers and copiers are not inexpensive and are, therefore, out of the financial reach of most amateur users.

SUMMARY OF THE INVENTION

It is an object of the invention to overcome the prior art disadvantages.

A more particular object of the invention is to provide an improved method of making positive pictures from individual film frames of motion-picture films, microfilms, film strips and the like.

A further object of the invention is to provide such an improved method as mentioned above, which permits an amateur consumer to make positive pictures from individual film frames without encountering undue difficulties or expense.

A concomitant object is to provide an apparatus for carrying out the novel method.

Pursuant to the above and still other objects, an aspect of the invention resides in a method of making positive photographic pictures from individual film frames of motion-picture films and the like, comprising the steps of exposing the image on a selected film frame onto a self-developing film sheet; and thereafter developing the film sheet to obtain a positive photographic picture of the image on the film frame.

To carry the above method into effect the invention proposes an apparatus which, briefly stated, comprises a film projector, means for holding self-developing film sheets, means for exposing the image of a respective selected film frame onto a self-developing film sheet, shutter means for controlling the exposure duration time, and means for developing a respective exposed film sheet.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a perspective view of another embodiment; and

FIG. 4 is a diagrammatic horizontal section through the apparatus of FIG. 3.

DESCRIPTION OF PREFERRED EMBODIMENTS

Figure 1:
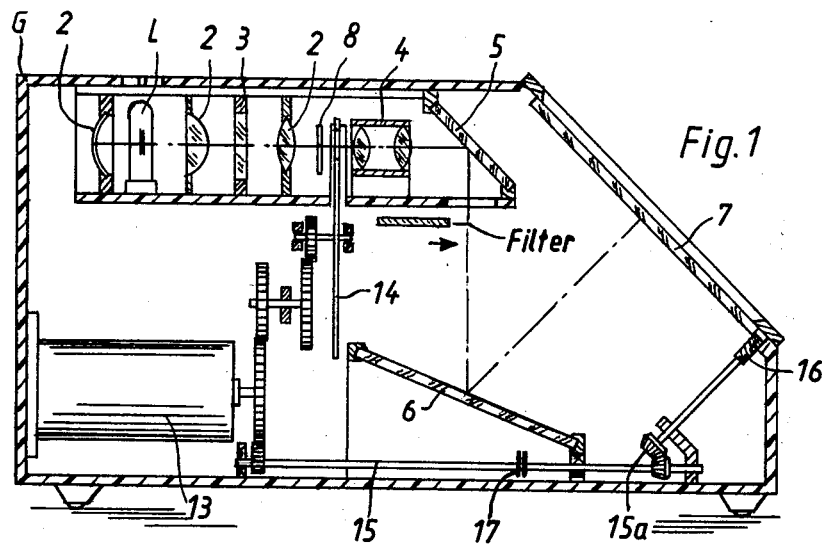
FIG. 1 is a somewhat diagrammatic vertical section through a projector forming part of an apparatus embodying the invention.
Figure 2:
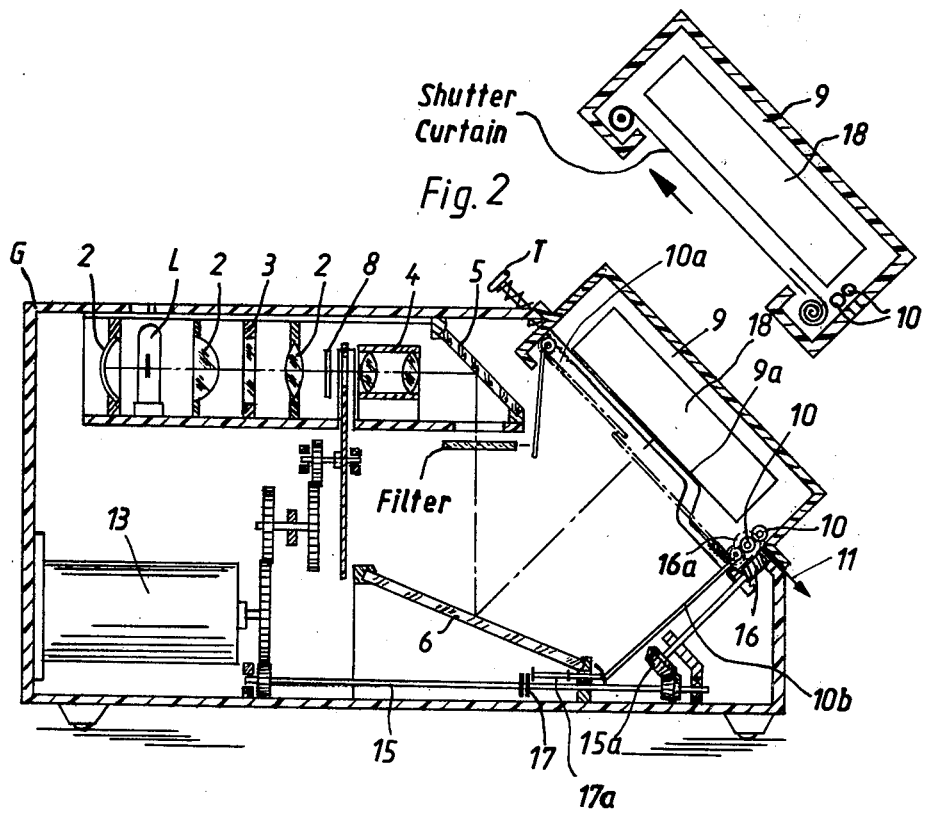
FIG. 2 is a view similar to FIG. 1, but showing the complete apparatus.

A first embodiment of an apparatus for practicing the invention is illustrated in FIGS. 1 and 2.

FIG. 1 shows a rear projection film projector which is known per se. For simplicity of illustration all elements which are not essential for an understanding of the invention are either omitted or illustrated in simplified form, it being understood that they are already well known. This includes, for example, the film transporting mechanism, the segment shutter (in some cases a rotating prism is used in its place in the known construction), the motor, the fan and the operating controls. In microfilm readers (which transport the film continuously) the transporting mechanism is in any case simpler.

The projector shown in FIG. 1 has a housing G, a lamp L, a condenser system 2 having a heat filter 3, a projection lens 4, two deflecting mirrors 5, 6 and a rear-projection screen 7. The film 8, e.g. a motion-picture film, is projected by the aforementioned elements onto the rear of screen 7, either as a motion picture or as a series of still pictures corresponding to respective film frames. A motor 13 drives a segment shutter 14 (known per se) via appropriate gearing (known per se and not shown in detail), as well as a film-gripping device and a film take-up (known per se and not shown). A shaft 15, also driven by the motor 13, has a disengageable clutch 17 interposed in it and drives, via a set of bevel gears 15a, a worm screw 16 which is mounted near the screen 7.

The apparatus as shown in FIG. 1 is by itself not able to make positive pictures from film frames. For this purpose its rear-projection screen 7 must be replaced with an adapter, as shown in FIG. 2. This adapter has a casing 9 which is sealed against the entry of ambient light except at its side facing inwardly of the housing G of the projector. A known-per-se film pack 18 (of the type used in self-developing, i.e. "instant-picture" cameras) is accommodated in the casing 9. The casing 9 can be removably secured to the housing G in any known manner; its open side facing the interior of housing G is provided with a shutter 10a (of the pivoting type or of the slotted type) which permits or blocks the access of light to the exposure window 9a of the film pack 18, depending upon whether or not an exposure is to be made. A simple slide could be used instead, should this be preferred.

Also mounted in casing 9 is a pair of cooperating nip rollers 10,10 between which each exposed film sheet from the film pack 18 must pass, and which in the usual manner spread the developing substance over the exposed picture area of the film sheet. A gripper mechanism (not shown, but known per se from self-developing cameras) is provided in the casing 9 to slide each exposed film sheet out of the film pack 18 and into the nip of rollers 10,10 which then effect its further transport through an outlet slot 11 while spreading the developer.

For the sake of simplicity and convenience it is advisable to drive the rollers 10,10, the shutter 10a and the not-illustrated gripper mechanism from the drive of the projector, for which purpose an appropriate coupling arrangement is to be provided.

In the illustrated embodiment this arrangement includes the shaft 15, the bevel gears 15a and the worm screw 16 mentioned earlier, as well as a gear 16a (shown diagrammatically) which is mounted on the shaft of one of the rollers 10 and moves into mesh with the worm screw 16 when the casing 9 is put in place on the housing G, as shown.

Since, as is well known, the motor (i.e. 13) of a projector must continue to run even while the projector is temporarily stopped, so as to continue powering a blower (not shown) which prevents overheating due to the powerful projection lamp L, the provision of the clutch 17 is advisable. Thus, transmission of power to the worm screw 16 is interrupted by the clutch 17 while a film is being screened. When the user identifies a film frame of which he desires to make a positive (paper) picture, he stops the film, replaces the screen 7 with the adapter, and triggers shutter 10a (e.g. manually by means of a button, lever or the like).[x] Thereafter, a mechanical or electrical control which may be activated by the shutter-closing mechanism, engages the clutch so that the worm screw 16 drives the film-sheet gripper and the rollers 10 to transport the just exposed film sheet out of the casing 9 through the slot 11. As shown in FIG. 2, the clutch may be actuated by a rod 17a, which is moved by the lid 10b leaving its open position or by an electromagnet.

[x]The shutter with two asymmetric lids is actuated by a toothed rod, which moves the lids by turning pinions of their shafts.

In the embodiment of FIGS. 3 and 4, like reference numerals identify the same components as in the preceding embodiment. Here, however, the mirror 5 is omitted and the removable adapter of FIGS. 1 and 2 is replaced with the permanently installed device 19 having a mirror which is mounted for pivotal movement between two positions 20 (full-line) and 20' (broken-line). In the position 20 this mirror directs a light beam from objective 4 to the rear-projection screen 7, whereas in position 20' the same light beam is directed to the exposure window 9a of film pack 18 which later can be installed through an appropriate (not illustrated) closable opening in the housing G. This mirror is mounted on a shaft to which a knob 20a is connected; the knob is located at the outside of the housing G and its turning moves the mirror between the positions 20 and 20'. Also mounted on this shaft, for rotation therewith, is a disk 20b to which three rods or similar elements 21, 22 and 23 are articulately connected. The rod 21 extends to the setting arm 24c of a shutter 24 (known per se). Rod 22 is articulated to the objective 4 which is so mounted that it can slide lengthwise of its optical axis, whereas rod 23 is connected to the shutter 10a (here a pivotal type) located in front of the film pack 18.

In the embodiment of FIGS. 3 and 4 a user screens a film, with the pivotable mirror set to the position 20, until he sees a film frame of which he desires to make a positive (paper) picture. He then stops the film and turns knob 20a to place the mirror in the position 20'. An interlock (not shown) may be provided to prevent such turning unless the film transport is stopped. The disk 20b, turning with the knob and mirror, closes and sets (cocks) the normally open shutter 24, while opening the other normally closed shutter 10a and shifting the objective 4 in the direction of arrow 22a by a predetermined distance. The latter measure is necessary to compensate for the surface-area differentials of the (smaller) exposure window 9a and the (larger) projection screen 7, i.e. to refocus the lens 4.

The shutter 24 is now triggered (in the same manner as in a single-lens-Reflex-camera of the RETINA REFLEX or HASSELBLAD-type) and admits light from the objective 4 via the mirror (position 20') to the film sheet behind film window 9a. After elapse of its preset opening time the shutter 24 closes; it is advantageously connected with the shutter 10a so as to close it at the same time to protect the interior of the device 19 from light. At the same time the drive, corresponding to the one discussed with reference to FIGS. 1 and 2 and omitted in FIGS. 3 and 4 for the sake of simplicity, is activated to expel and develop the exposed film sheet, and the shutter 24 is reopened.

Since the required exposure time is predetermined by the light sensitivity of the self-developing film sheets in the film pack 18, and by the amount of light supplied by the projection bulb L of the apparatus, it is advantageous to preset the shutter 24 for a fixed period of exposure time. It is, however, possible to make the FIGS. 3-4 adapter removable (as in FIGS. 1-2) so that it can be used with different projectors. In such event a control arrangement may be provided which permits the setting time of shutter 24 to be varied, in dependence upon the characteristics of a particular projector. A manually operable fine-adjustment may also be provided to compensate for minor light-level fluctuations (e.g. the light is somewhat brighter when a new bulb is installed).

The dichroitic mirrors and/or heat filters used in the projector may cause the light to diverge significantly from the color temperature required by the self-developing film sheets. If so, large-dimensioned correction filters may be permanently installed in the device. Such filters are used in photographic color enlargers.

The disclosed invention is susceptible of a variety of modifications. For example, in all embodiments the (not illustrated) film sheet gripper may be operated manually or by a separate motor forming part of the adapter. In apparatus according to FIGS. 1-2, where the screen 7 has a size which is approximately the same as that of the film-sheet format, the adapter can be used to directly replace the screen 7 after the latter is pushed or swung aside. The adapter may, however, also be so mounted on the projector housing that it is simply movable relative thereto between a rest and an operative position; it may then be coupled with the screen so that movement of the adapter to the operative position will cause the screen to move to a rest position, and vice versa.

If the construction is such that the size of the projection screen is slightly larger than the picture format of the film-sheets, then adjusting marks may be provided on the screen so that vertical adjustment of the image can be effected by e.g. adjustment of the projection mirror whereas horizontal image adjustment can be effected by e.g. shifting the screen with its markings relative to the projected image. This adjusted position can then be transmitted to the adapter by directly coupling the same with the moving adjusting components. Tilting of the mirror to position 20', or the aforementioned movement of the adapter from rest position to operative position, may be employed to cock the shutter (e.g. 24 in FIGS. 3-4) and, if desired, to trigger the shutter (with or without delay). To simplify the construction of FIGS. 3-4 the shutter 24 could be mounted so that it can be pivoted into and out of the position in which it intercepts light passing from objective 4 towards the mirror 20,20'. This allows the use of a simpler shutter 24 and of simpler shutter operating controls. Color conversion filters may be provided which can be pivoted or slid into the path of light during the exposure of the self-developing film sheets, in order to accommodate the spectral sensitivity of the image and the projection light to one another, as known from photographic enlargers. An advantage of the invention resides also in the fact that an even number of mirrors, and actually only two of them, suffices to produce non-reversed images, contrary to prior-art self-developing film systems.

While the invention has been illustrated and described as embodied in an apparatus for making instant-picture paper copies from film frames, it is not intended to be limited to the details shown, since various modifications and structural changes may be made without departing in any way from the spirit of the present invention.

x/ xIt is possible, to replace the lid-type-shutter with a focal plane shutter with curtains consisting of cloth as known from single lens reflex cameras. In this case the width of the slot and the speed of the curtains determine the exposure of the picture. In the printer shown in FIG. 4 the shutter 24 therefore may be omitted. In the printer shown in FIG. 2 the clutch 17 is to actuate preferably with an electromagnetic device.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An apparatus for making positive photographic pictures from individual film frames of motion-picture films and the like, comprising a rear-projection film projector having an objective which is slidable along its optical axis, a rear-projection screen, and a series of deflecting mirrors at least one of which is interposed between said objective and the screen to direct a light beam from the objective onto the screen; means for holding self-developing film sheets to be exposed, said at least one mirror being pivotable between one position in which it directs the light beam onto said screen and another position in which it directs the light beam onto the film sheet to be exposed; shutter means for controlling the exposure duration time; means coupling said at least one mirror and said objective so that the objective slides along said optical axis in response to pivoting of said mirror to said other position, so as to compensate for size differentials between the screen size and the film sheet size; and means for developing a respective exposed film sheet.

2. Apparatus as defined in claim 1; and further comprising means connecting said at least one mirror with said shutter means and operative to cock the shutter in response to pivoting of said one mirror to said other position.

3. Apparatus as defined in claim 2, said shutter means further comprising a light-blocking closure in front of film sheets held by said holding means; and means coupling said one closure with said mirror and operative to open the closure in response to pivoting of said one mirror to said other position.

4. Apparatus as defined in claim 1; and further comprising a color correcting filter mounted for selective movement into and out of the exposure light path which extends to said holding means.

* * * * *